(12) United States Patent
Suga

(10) Patent No.: US 6,234,031 B1
(45) Date of Patent: *May 22, 2001

(54) FINGERPRINT DETECTION APPARATUS

(75) Inventor: Michihisa Suga, Tokyo (JP)

(73) Assignee: NEC Corporaion, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,619

(22) Filed: Nov. 19, 1998

(30) Foreign Application Priority Data

Nov. 27, 1997 (JP) .................................................... 9-326414

(51) Int. Cl.⁷ ....................................................... G01L 1/22
(52) U.S. Cl. .................................... 73/862.474; 73/862.52
(58) Field of Search ........................ 73/862.391, 862.46, 73/862.473, 862.474, 862.52, 862.041, 862.046, 862.68

(56) References Cited

U.S. PATENT DOCUMENTS

| | | | | |
|---|---|---|---|---|
| 4,221,975 | * | 9/1980 | Ledniczki et al. | 307/116 |
| 4,353,056 | | 10/1982 | Tsikos | 340/146.3 |
| 4,644,801 | * | 2/1987 | Kustanovich | 73/862.046 |
| 4,839,512 | * | 6/1989 | Speck | 250/231.1 |
| 5,429,006 | * | 7/1995 | Tamori | 73/862.046 |
| 5,583,303 | * | 12/1996 | Franz | 73/862.046 |
| 5,844,287 | * | 12/1998 | Hassan et al. | 257/419 |

FOREIGN PATENT DOCUMENTS

| | | |
|---|---|---|
| 61-222178 | 10/1986 | (JP) . |
| 63-204374 | 8/1988 | (JP) . |
| 63-310087 | 12/1988 | (JP) . |
| 02-85914 | 3/1990 | (JP) . |
| 04-231803 | 8/1992 | (JP) . |
| 05-61965 | 3/1993 | (JP) . |
| 05-242229 | 9/1993 | (JP) . |
| 07-98754 | 4/1995 | (JP) . |
| 07-168930 | 7/1995 | (JP) . |
| 8-305832 | 11/1996 | (JP) . |
| 9-126918 | 5/1997 | (JP) . |

* cited by examiner

Primary Examiner—Max Noori
(74) Attorney, Agent, or Firm—Sughrue, Mion, Zinn, Macpeak & Seas, PLLC

(57) ABSTRACT

Providing a fingerprint detection apparatus which is small in size, low in cost and high in reliability. The fingerprint detection apparatus includes a shape transfer unit having a contact face for being contacted by a finger whose fingerprint is to be detected, the shape transfer unit having a thickness which varies, when a finger contacts with a surface which serves as the contact face, in accordance with pressures which are produced by concave and convex patterns of the fingerprint of the finger, and a detection driving circuit unit for detecting a pattern of the fingerprint based on variations of the thickness of the shape transfer unit and outputting results of the detection as electric signals, and detects a fingerprint pattern in accordance with variations of the thickness of the shape transfer unit.

18 Claims, 8 Drawing Sheets

FINGERPRINT DETECTION APPARATUS

BACKGROUND OF THE INVENTION

1. Field of the Invention

This invention relates to a fingerprint detection apparatus which reads and converts a finger print into an electric signal and outputs the electric signal, and more particularly to a fingerprint detection apparatus which reads a fingerprint pattern based on a pressure distribution obtained when a finger is pressed against the fingerprint detection apparatus.

2. Description of the Related Art

As the information-oriented society and card-dependent society has develop rapidly, the strong demand for security is increasing. In order to satisfy this demand, progress is being made in development of various techniques which use a characteristic of the body of an individual to identify the individual. A technique for identifying individuals which uses a fingerprint and can be carried out readily is expected to have high applicability in the future for various terminal equipments and is expected to be put into practical use.

Most of the fingerprint detection apparatus which have been practical and widely used rely upon an optical system which employs a rectangular prism, as disclosed, for example, in Japanese Patent Laid-Open No. 13446/1980.

However, a fingerprint detection apparatus which relies upon an optical system which employs a rectangular prism is limited in miniaturization of the apparatus because the prism itself has a large size and it is difficult to make the focal length of an optical lens short. Further, since optical parts are used, reduction in cost of the fingerprint detection apparatus is also limited.

Further, the fingerprint detection apparatus which relies upon an optical system has a problem in that, when a finger is too wet or too dry, the fingerprint pattern detected is obliterated or becomes blurred. Therefore, the fingerprint detection apparatus is not sufficiently high in practical use in terms of reliably identifying an individual with certainty under any circumstances.

In order to raise reliability, a fingerprint detection apparatus is proposed in Japanese Patent Laid-Open No. 98754/1995 which does not have a structure wherein a finger is pressed directly against a surface of a prism but has a structure wherein a resilient transparent optical member and a liquid coupling member are interposed between an optical reference surface on which a finger is pressed and a surface of a prism. This structure provides closer contact between the finger and the optical reference surface and allows a stabilized fingerprint pattern to be obtained.

However, with the fingerprint detection apparatus disclosed in Japanese Patent Laid-Open No. 98754/1995 also, the optical principle on the optical reference surface is the same as that when the finger is pressed directly against the prism surface. Therefore, while the fingerprint detection apparatus achieves a little improvement in regard to the problems of reliability as described above, it is still disadvantageous in that, if the finger is sufficiently wet, the fingerprint pattern detected is obliterated, or if the surface on which a finger is pressed is soiled or foreign articles are stuck to the surface, the fingerprint pattern detected is disordered.

As described above it is particularly difficult for fingerprint detection apparatus which rely upon an optical system, to satisfy the demand for miniaturization. Therefore, fingerprint detection apparatus which do not rely upon an optical system have been proposed.

For example, a fingerprint sensor is disclosed in Japanese Patent Laid-Open NO. 27277/1983 wherein resistance elements or piezoelectric elements which have a pressure dependency are used to convert a pressure pattern obtained from concave and convex patterns of a fingerprint when a finger is pressed into a voltage pattern so that the pressure pattern is outputted as an electric signal. The document mentioned further discloses another fingerprint sensor wherein resistance elements or pyro-electric elements which have a temperature dependency are used to convert a temperature pattern obtained from concave and convex patterns of a fingerprint into a voltage pattern so that the temperature pattern is outputted as an electric signal.

The sensors disclosed in Japanese Patent Laid-Open No. 27277/1983 are formed by using an integrated circuit technique which uses silicon crystal. Conversion elements which generate voltage signals from pressures or temperatures are arranged in arrays aligned horizontally and vertically and are covered with a protective film such as an oxide film or a nitride film so that reliability will not be damaged even if a finger touches them directly.

However, such protective films are liable to be broken since they are hard and thin. Therefore, if even a small crack or pinhole is produced in the protective film, then an impurity such as sodium which sticks to the protective film by contact of a finger or the like penetrates through the crack or pinhole and becomes a cause of deterioration of the characteristics of a circuit elements such as a conversion element or a transistor.

As another conventional example of a non-optical fingerprint detection apparatus, a fingerprint sensor which detects the concave and convex configuration of a fingerprint as variations in electrostatic capacity and output the variations as electric signals is disclosed in Japanese Patent Laid-Open No. 231803/1992 and Japanese Patent Laid-Open No. 305832/1996.

In both of the fingerprint detection sensors disclosed, detection elements having detection electrodes covered with an insulating material are arranged in arrays in the row direction and column direction.

Further, the fingerprint detection sensors make use of the principle that, when a finger is pressed against a surface of the insulating material which covers over the detection electrodes, a ridge portion of the fingerprint contacts directly with the insulating material while at a valley portion of the fingerprint an air layer remains between the insulating material and the skin of the finger. Due to this principle, the electrostatic capacity between the surface of the finger and a detection electrode exhibits a higher value at the ridge portion than at the valley portion. An electric signal of a current or voltage whose variated by such a difference in electrostatic capacity as just described is outputted to detect a fingerprint pattern. Also the sensor described above are formed on a chip using an integrated circuit technique which uses silicon crystal similar to the conventional examples described above.

FIG. 1 is a diagrammatic view showing a construction of a fingerprint inputting apparatus disclosed in Japanese Patent Laid-Open No. 305832/2996.

As shown in FIG. 1, the present conventional example makes use of the fact that the electrostatic capacity is different in concave and convex portions of a configuration formed by valley lines 518 and ridgelines 519 of a fingerprint pattern against main surface 511 to which a fingerprint is brought near or contacted, and electrically detects the electrostatic capacities in accordance with the concave and convex configuration by detection circuits 513 by using electrodes 512 arranged on main surface 511 at a pitch finer than the line width of the fingerprint.

It is important that the coating of an electric material function also as a protective film for an integrated circuit, but since a protective film of a conventional integrated circuit technique is not formed to cope with the contact of a finger and besides is hard, thin and liable to be damaged, there is a problem in that the characteristics of the integrated circuit is deteriorated by mechanical damage, pollution of the integrated circuit by an impurity, and so forth.

Further, if the surface of the insulating material is soiled with sweat of a finger or the like and the insulation characteristic of the surface is deteriorated, then leak current flows along the surface and decreases the difference in capacitance between a ridge portion and a valley portion of the fingerprint. This gives rise to a problem that the contrast of the fingerprint pattern is reduced and, in an extreme case, reduced to such a degree that the fingerprint pattern itself cannot be discerned.

Another conventional example of a fingerprint sensor of the monolithic type which uses silicon crystal is disclosed in Japanese Patent Laid-Open No. 126918/1997.

In the conventional example just mentioned, a pressure pattern originating from the convex and concave configuration of a fingerprint when a finger is pressed against the fingerprint sensor is detected by pressure sensors arranged in a matrix array and is outputted as electric signals. For the pressure sensors, piezoelectric resistors, a variable capacitor and a micro-conductor positioned on an insulating layer extending above a cavity are used. Further, in the present conventional example, in order to prevent a finger from touching the protective film formed on the sensors directly, a flexible layer formed from silicone or the like is provided additionally on the protective film in order to protect the sensors in an integration manufacturing process so that pressure acts upon the pressure sensors when a finger is pressed against the surface of the flexible layer.

The pressure acts only upon the pressure sensors which correspond to ridge portions of the fingerprint, and deflective deformation is produced in the insulating layer extending above the cavity by the action of the pressure.

When piezoelectric resistors are used as the pressure sensors, the resistance values of the piezoelectric resistors varied by the deflective deformation of the insulating layer are utilized so that pressure distribution originating from the concave and convex configuration of the fingerprint is outputted as electric signals. When variable capacitors are used as the pressure sensors, the thickness of the cavity is varied by the deflective deformation of the insulating layer and the variation in electrostatic capacity between two electrodes provided across the cavity is utilized to output electric signals corresponding to the pressure distribution. Further, when micro-conductors are used as the pressure sensors, two electrodes disposed across the cavity are brought into contact to establish a conducting state when the cavity is crushed by the deflective deformation of the insulating layer, so that electric signals corresponding to the pressure distribution are outputted.

Whichever kind or pressure sensor is utilized, in the present conventional example since it is important that the pressure acting on the sensors efficiently produce the deflective deformation of the insulating layer, it is necessary for the flexible layer, that is used as a protective film over the sensor, to have a degree of flexibility so that it does not disturb the deflective deformation of the insulating layer.

On the other hand, if the flexibility of the flexible layer is such that the flexible layer is easily crushed by the pressure acting thereupon, the deflective deformation of the insulating layer will be reduced by the amount of the pressure absorbed in the deformation of the flexible layer itself.

In order to reduce the ratio at which the acting pressure is absorbed by the flexible layer and maintain enough flexibility to not disturb the deflective deformation of the insulating layer, the flexible layer must be made thin. This, however, gives rise to a problem that the surface protecting function which is the original object of the flexible layer is deteriorated significantly.

A pressure sensor which makes use of the fact that the thickness of the cavity is varied by an action of the pressure and this in turn varies the electrostatic capacity is disclosed in Japanese Patent Laid-Open No. 22178/1986 prior to the conventional technique disclosed in Japanese Patent Laid-Open No. 126918/1997 mentioned hereinabove.

FIG. 2 is a sectional view showing a structure of the field effect type pressure sensor disclosed in Japanese Patent Laid-Open No. 22178/1986.

As shown in FIG. 2, in the present conventional example, gate electrode 606 of a field effect transistor and gate insulating film 605 between channels are defined by cavity chamber 607. When the gate capacitance is varied as pressure acts, channel current is modulated and an electric signal output is obtained. Further, in the present conventional example, also a pressure sensor made of a high molecular compound having a superior elasticity is filled in to the cavity.

In the present conventional example, the variation in thickness of the cavity due to pressure is required to be as great as possible. To this end, it is important that the elastic layer made of a high molecular compound have a sufficient flexibility to absorb pressure acting thereupon as much as possible and more preferably is set so as to allow deformation also in directions perpendicular to the thickness.

However, in the present conventional example, since it has the structure that a high molecular compound having a superior elasticity is enclosed in the cavity, the resilient layer cannot be deformed in directions perpendicular to the thickness thereof. As a result, there is a problem that the deformation of the resilient layer in the direction of the thickness by an action of a pressure is limited significantly.

FIG. 3 is a view showing a construction of a pressure type fingerprint inputting apparatus disclosed in Japanese Patent Laid-Open No. 204374/1985, and FIG. 4 is a partial sectional view of a fingerprint inputting plate shown in FIG. 3 which is in an assembled state.

The fingerprint inputting apparatus in the present conventional example includes matrix electrode sheet 720, insulating sheet 721 and pressure sensitive sheet 722 layered one on another as shown in FIG. 3. Matrix electrodes are formed on matrix electrode sheet 720 by forming a plurality of X direction scanning electrodes $1_{x1}$, $1_{x2}$, . . . in parallel by vapor deposition or sputtering on an upper face of substrate 720$a$ made of a material such as alumina or a semiconductor and forming a plurality of Y direction scanning electrodes $1_{y1}$, $1_{y2}$, . . . in parallel to one another but perpendicularly to X direction scanning electrodes $1_{x1}$, $1_{x2}$, . . . by a similar method on a lower face of substrate 720$a$. Y direction scanning electrodes $1_{y1}$, $1_{y2}$, . . . are partially exposed to the upper face of substrate 720$a$ through through-holes to define conductor portions $P_{y1}$, $P_{y2}$, . . . .

Insulating sheet 721 has a large number of openings 721$a$ formed therein such that they are positioned at locations centered at intersecting points of the matrix electrodes formed on matrix electrode sheet 720.

Pressure sensitive sheet 722 has a resistance value which varies in accordance with the magnitude of a pressure acting thereupon.

If finger 730 is placed on and pressed against the fingerprint inputting apparatus as seen in FIG. 4, then pressure sensitive sheet 722 is deflected around fulcra provided by a frame of opening 721a and brought into contact with X direction scanning electrode $1_x$ (for example, X direction scanning electrodes $1_{x1}$) and conductor portion $P_y$ (for example, conductor portions $P_{y1}$) of Y direction scanning electrode $1_y$ (for example, Y direction scanning electrode $1_{y1}$) on the upper face of matrix electrode sheet 720, whereupon the lateral resistance value between them varies in response to the pressing force. Consequently, the variations in resistance value in accordance with the fingerprint pattern can be detected as variations in current value.

FIG. 5 is a view showing a construction of a contact type fingerprint inputting apparatus disclosed in Japanese Patent Laid-Open No. 310087/1988.

As shown in FIG. 5, in the present conventional example, a fingerprint inputting plate is formed on a flat insulating plate against which fingertip 820 is to be pressed, and a contact plate and a matrix circuit unit successively layered on a surface of the insulating plate. The contact plate has spot-like contact electrodes 812 provided thereon at intervals sufficiently smaller than the pitches of ridge portions 820a and valley portions 820b of a fingerprint pattern. The matrix circuit unit has a plurality of scanning electrodes disposed in such a manner as to intersect with each other at the positions of spot-like contact electrodes 812 to form a matrix. Further, detection electrode members are provided individually in a spaced relationship from the contact electrodes such that, when fingertip 820 is placed across the fingerprint inputting plate and the detection electrode members and the scanning electrodes are scanned in a predetermined order, electric conducting and non-conducting states between the contact electrodes and the detection electrode members depending upon whether each of the contact electrodes corresponding to the intersecting points of the scanning electrodes contacts with the fingerprint at ridge portion 820a or does not contact with the fingerprint at valley portion 820b are extracted as fingerprint data.

As described above, in the prior art, an apparatus which satisfies all of reduction in size, reduction in cost and high reliability which are important conditions for practical use is not available as yet.

In particular, in an optical fingerprint detection apparatus which uses a rectangular prism, while optical parts such as a prism and an optical lens are used, optical parts at present have a limitation when it is intended to achieve reduction in size and reduction in cost of an apparatus.

Further, since the principle in detection of a fingerprint pattern makes use of a difference in refractive index of an optical reference surface against which a finger is pressed, the optical fingerprint detection apparatus has a problem in that it cannot achieve high reliability in that the fingerprint pattern is blurred or obliterated by an influence of the contacting condition when the finger is pressed against the optical reference surface and besides by an influence of a dry condition, a wet condition or some other condition of the finger.

Further, also with a fingerprint detection apparatus wherein a layer made of a resilient transparent optical member is formed on a surface of a prism against which a finger is pressed to improve close contact with the finger, the problem of reliability that the fingerprint pattern is liable to be disordered by a dry or wet condition of a finger is not solved.

Further, the fingerprint detection apparatus just described has another problem in that the surface of the layer made of a resilient transparent optical member is more liable to suffer from sticking of soiling matter than a face of glass and a large amount of such sticking matter makes production of a good fingerprint pattern difficult.

Meanwhile, although a fingerprint sensor formed from a semiconductor integrated circuit has been proposed as an effective means for achieving reduction in size and reduction in cost, it does not have sufficient utility in terms of reliability.

In an integrated fingerprint sensor which makes use of the fact that a pressure pattern or a temperature pattern can be obtained from a concave and convex pattern of a fingerprint and outputs electric signals corresponding to a fingerprint pattern through conversion elements disposed in arrays of rows and columns in order to extract variations in pressure or temperature as variations in resistance or voltage, since the protective film such as an oxide film or a nitride film which covers over the surface is hard and thin, it is liable to be damaged, and if even a small crack or pinhole is produced in the protective film, then an impurity such as sodium which sticks to the protective film as a result of contact of a finger with it penetrates through the crack or pinhole and makes a cause of deterioration of a characteristic of the integrated conversion elements or circuit elements.

Meanwhile, in another integrated fingerprint sensor which detects concave and convex patterns of a fingerprint as variations in electrostatic capacity and extracts the variations as electric signals, in addition to the problem described above, if the surface of the protective film is soiled by sweat or the like and the insulation characteristic of the surface is deteriorated, then leak current is produced on the surface and this gives rise to a problem that the contrast of the fingerprint pattern is decreased and, in an extreme case, the fingerprint pattern itself becomes indiscernible.

Furthermore, in a further integrated fingerprint sensor which utilizes a piezoelectric resistor, a variable capacitor or a micro-conductor positioned on an insulating layer extending above a cavity, in order to reduce the ratio at which the pressure acting upon the insulating layer is absorbed by the flexible layer and hold such a flexibility that it does not disturb deflective deformation of the insulating layer, the thickness of the flexible layer must be thin. This gives rise to a problem that the surface protecting function which is the original object of the insulating layer is deteriorated significantly.

Further, with other pressure sensors wherein variations in pressure are detected as variations in electrostatic capacity, since the insulating layer cannot be deformed in directions perpendicular to the direction of the thickness, there is a problem that also deformation of the insulating layer in the direction of the thickness by an action of a pressure occurs less likely.

SUMMARY OF THE INVENTION

It is an object of the present invention to provide a fingerprint detection apparatus which solves such problems of the prior art as described hereinabove and is small in size, low in cost and high in reliability.

In the present invention, concave and convex patterns of a fingerprint are transferred to a flexible electrode disposed on detection electrodes or detection elements of a detection driving circuit unit through a deformation layer which is formed from an insulating resilient layer or an insulating fluidic layer. In particular, when a finger is pressed from above against the flexible electrode at a ridge portion of the fingerprint, a pressing force acts upon the flexible electrode, whereupon the flexible electrode yields in a direction in which the deformation layer is crushed, but at a valley portion of the fingerprint, the flexible electrode is not acted upon by a pressing force but is acted upon only by a repulsive force from the deformation layer and is swollen.

The concave and convex patterns of the fingerprint are transferred to the flexible electrode in this manner, and the distances between the flexible electrode and the individual detection electrodes or detection elements disposed in arrays vary in accordance with the concave and convex patterns of the fingerprint. Such variations in position of the flexible electrode are detected as variations in electrostatic capacity and outputted as electric signals.

While, with conventional integrated fingerprint sensors, a finger is pressed directly against a hard protective film, in the present invention, a finger is pressed against a face covered with the deformation layer and the flexible electrode, and consequently, the surface protecting function for circuit elements of the detection driving circuit unit are improved significantly.

Further, since, in conventional integrated fingerprint sensors, a finger itself serves also as an electrode opposing to detection electrodes, the surface of the protective film against which a finger is to be pressed is soiled, and if such soiling results in decline of the insulation of the protective film, then it becomes impossible to detect any difference provided by a concave and convex configuration of a fingerprint. In the present invention, since the electrostatic capacities between the detection electrodes or detection elements and the flexible electrode in the form of a layer arranged in an opposing relationship to the detection electrodes or detection elements are detected, output signals are not influenced by soiling of the face against which a finger is pressed or the like.

Further, since the concave and convex patterns of the fingerprint are transferred stably to the flexible electrode irrespective of a wet condition or a dry condition of the finger, output signals are not influenced by a dry or wet condition of the finger, different from the case wherein an optical fingerprint sensor is employed.

Further, in the present invention, since the pressing force of the finger need not be transmitted to some other element through the deformation layer, the thickness of the deformation layer need not be made particularly small and may be such a thickness as is required to protect the integrated elements when a finger is pressed against it. Consequently, the reliability can be improved significantly.

Further, in the present invention, since the deformation layer is formed as a layer over a required area, the variation in thickness of the deformation layer with respect to a pressing force can be set high when compared with that in the case wherein the deformation layer is enclosed in a cavity.

Further, where fine gaps are formed on at least one of surfaces of the deformation layer, the variation in thickness with respect to a pressing force of a finger can be set to a larger amount.

As described above, according to the present invention, reduction in size and reduction in thickness can be achieved readily. Further, a polycrystalline silicon circuit formed on a glass substrate can be produced by a production process which is not complicated because the substrate is inexpensive. Consequently, reduction in cost can be achieved readily.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 8b is a plan view of the switching transistor and the detection electrode shown in FIG. 8a;

DETAILED DESCRIPTION OF THE PREFERRED EMBODIMENTS (First Embodiment)

Figure 1:
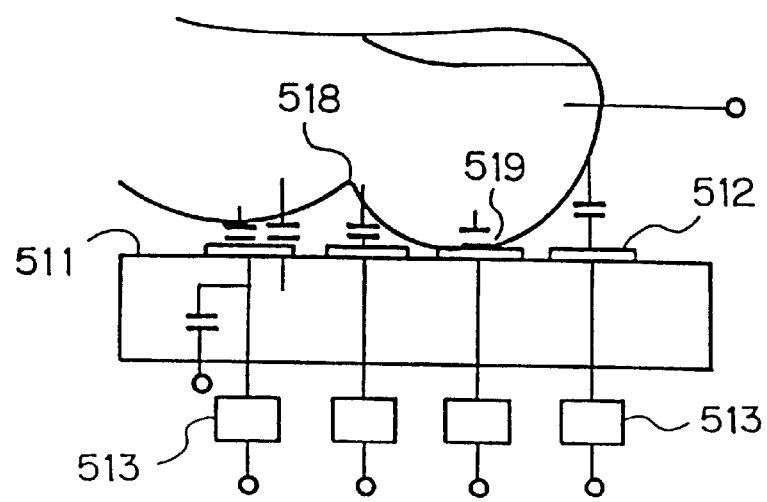
FIG. 1 is a view showing a construction of a fingerprint inputting apparatus disclosed in Japanese Patent Laid-Open NO. 305832/1996.
Figure 2:
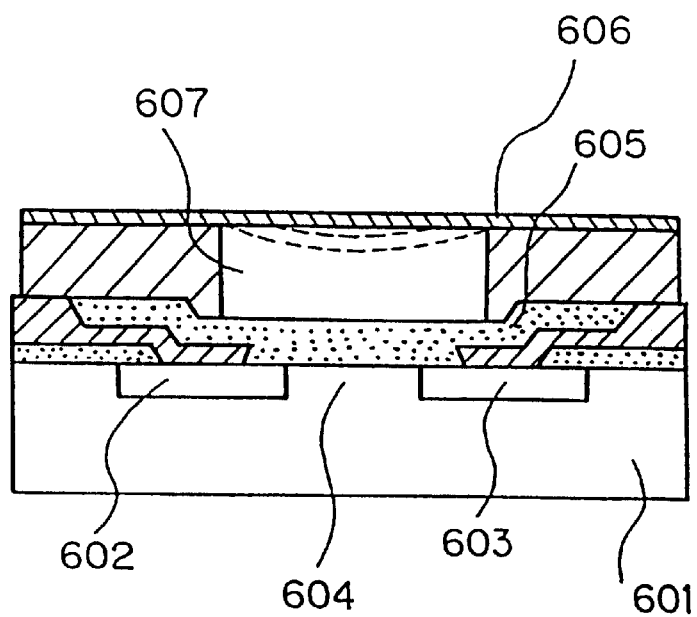
FIG. 2 is a sectional view showing a structure of a field effect type pressure sensor disclosed in Japanese Patent Laid-Open No. 22178/1986.
Figure 3:
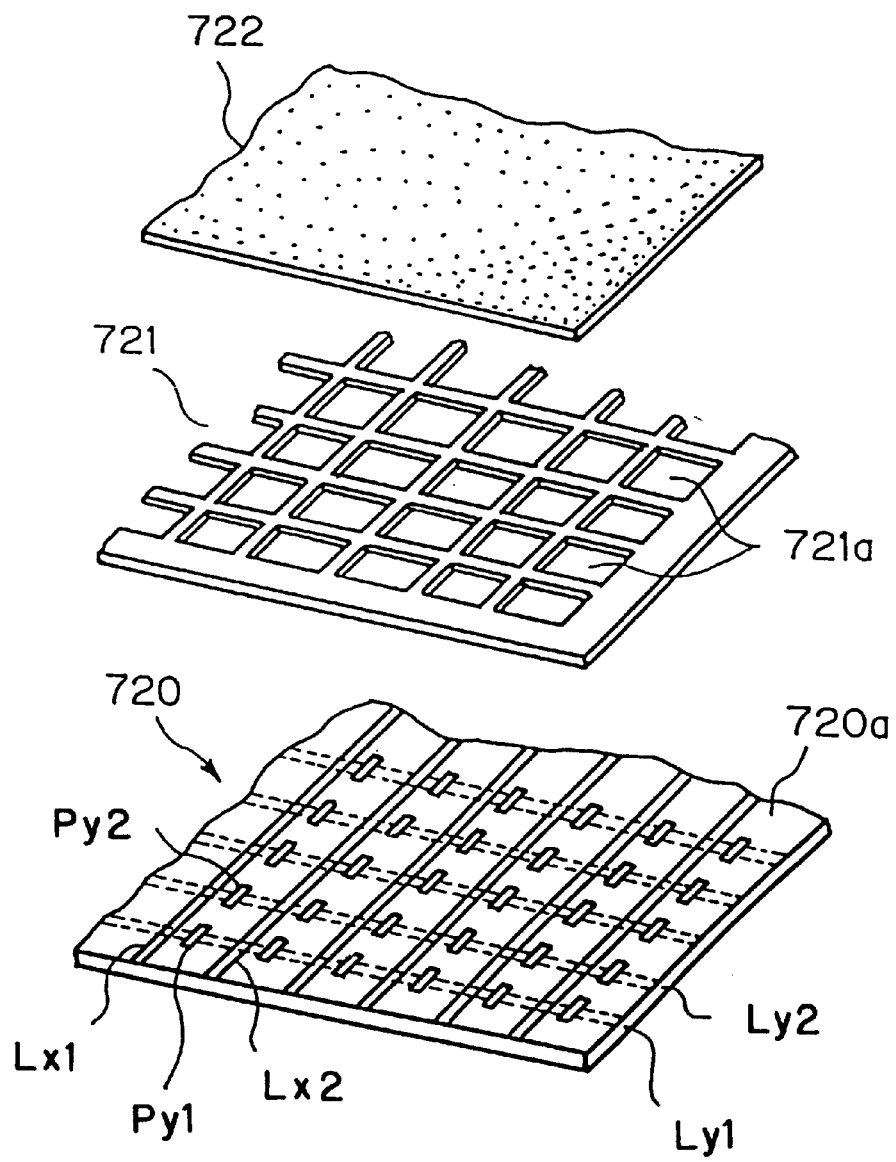
FIG. 3 is a view showing a construction of a pressure type fingerprint inputting apparatus disclosed in Japanese Patent Laid-Open No. 204374/1988.
Figure 4:
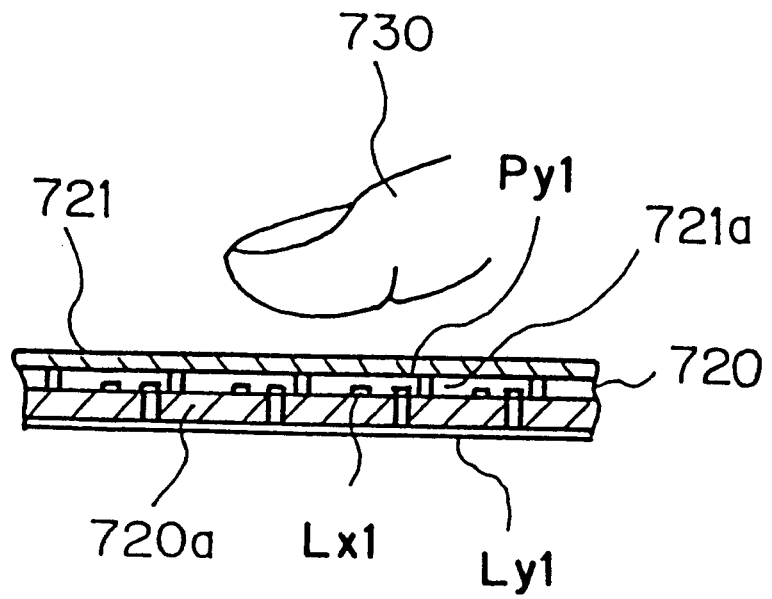
FIG. 4 is a partial sectional view of a fingerprint inputting plate shown in FIG. 3 which is in an assembled state.
Figure 5:
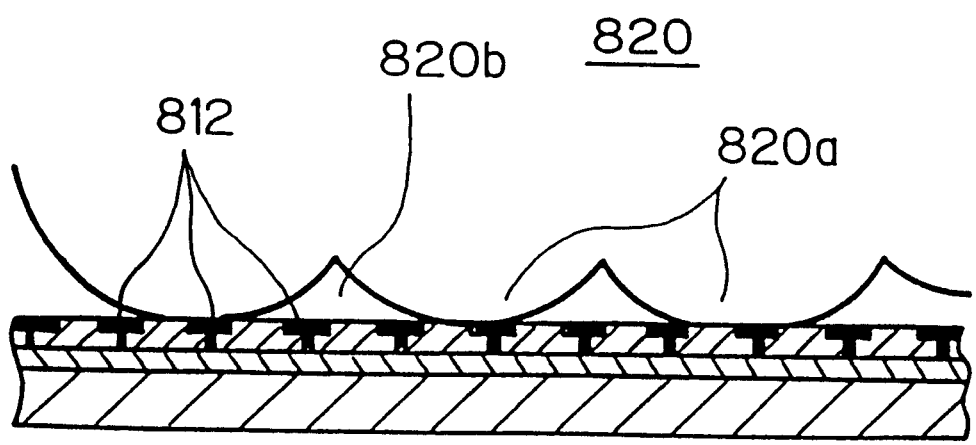
FIG. 5 is a view showing a construction of a contact type fingerprint inputting apparatus disclosed in Japanese Patent Laid-Open No. 310087/1988.
Figure 6:
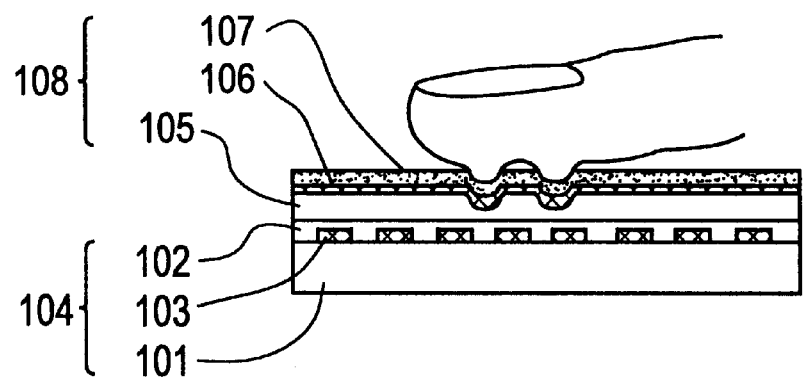
FIG. 6 is a schematic sectional view showing a construction of a first embodiment of a fingerprint detection apparatus of the present invention.

FIG. 6 is a schematic sectional view showing a construction of a first embodiment of a fingerprint detection apparatus of the present invention.

The present embodiment includes, as shown in FIG. 6, shape transfer unit 108 which has a contact face with which a finger whose fingerprint is to be detected is to be contacted and has a thickness which varies, when a finger is contacted with a surface which serves as the contact face, in accordance with the pressures produced by concave and convex patterns of the fingerprint of the finger, and detection driving circuit unit 104 formed below shape transfer unit 108 for detecting the pattern of the fingerprint based on the variations of the thickness of shape transfer unit 108. Shape transfer unit 108 includes deformation layer 105 which is formed on detection driving circuit unit 104 and having a thickness which varies in accordance with pressures produced by the concave and convex patterns of the fingerprint, flexible electrode 106 which is formed on deformation layer 105 and can be deformed based on the pressures produced by the concave and convex patterns of the fingerprint, and deformable surface protective layer 107 which is formed on flexible electrode 106 for protecting flexible electrode 106. Meanwhile, provided on detection driving circuit unit 104 are substrate member 101, detection electrodes 103 which are arranged in arrays on substrate member 101 for detecting the pattern of the fingerprint based on electrostatic capacities between flexible electrode 106 and detection electrodes 103, and insulating protective layer 102 formed on detection electrodes 103 for protecting detection electrodes 103.

It is to be noted that detection driving circuit unit 104 is manufactured as an integrated circuit device which is composed of MOS transistors, thin film transistors and so forth made of single crystal Si, polycrystalline silicon in the form of a thin film formed on a glass substrate under a low temperature condition or a like material by using an integrated circuit manufacturing technique which has been put into practical use.

Protective layer 102 is generally formed from an oxide film, a nitride film or a like film and assures stability in operation of semiconductor elements which are components of the circuit.

Deformation layer 105 is made of an elastic substance such as rubber, an insulating fluidic substance or a deformation medium in the form of gel.

Flexible electrode 106 is required not to disturb deformation of deformation layer 105 along a concave and convex configuration of a fingerprint and is formed thin from a conductive thin film or the like of a metal or metal oxide film such that it can be deformed freely.

Surface protective layer 107 is provided in order to prevent flexible electrode 106 from being touched directly by a finger to prevent damage to or corrosion of flexible electrode 106 and is formed thin from a plastic film or a like film so as not to disturb deformation of deformation layer 105.

In the fingerprint detection apparatus having the construction described above, when a finger contacts with the surface of surface protective layer 107, then surface protective layer 107 and flexible electrode 106 are deformed in accordance with the fingerprint pattern of the finger, and consequently, the thickness of flexible electrode 106 varies.

As the thickness of deformation layer 105 varies, the distances between flexible electrode 106 and detection electrodes 103 vary, and consequently, the electrostatic capacities between flexible electrode 106 and detection electrodes 103 vary.

The variations of the electrostatic capacities between flexible electrode 106 and detection electrodes 103 are converted into electric signals and outputted as a pattern of the fingerprint.

In the following, the construction of detection driving circuit unit 104 described above is described in detail with reference to the drawings.

Figure 7:
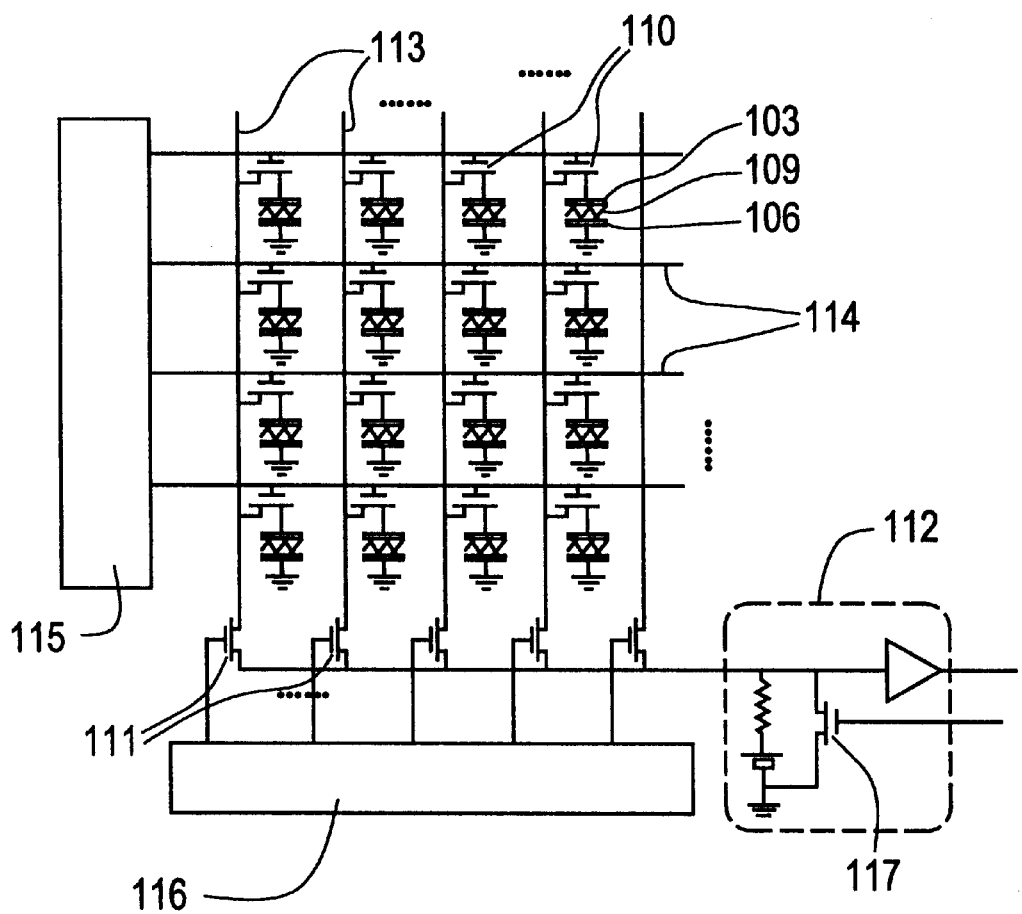
FIG. 7 is a circuit diagram showing an example of a construction of a detection driving circuit unit shown in FIG. 6.

FIG. 7 is a circuit diagram showing an example of a construction of detection driving circuit unit 104 shown in FIG. 6. It is to be noted that the electrostatic capacities between flexible electrode 106 and detection electrodes 103 are individually represented by capacitive elements 109, and flexible electrode 106 are normally kept at the ground potential.

Detection driving circuit unit 104 in the present embodiment includes, as shown in FIG. 7, detection circuit 112 for detecting the electrostatic capacities between the plurality of detection electrodes 103 arranged in a matrix and flexible electrode 106, converting results of the detection into electric signals and outputting the electric signals as a pattern of a fingerprint, data lines 113 for interconnecting capacitive elements 109 in the column direction, gate lines 114 for interconnecting capacitive elements 109 in the row direction, first and second scanning circuits 115 and 116 for successively selecting capacitive elements 109 in the row direction and the column direction, respectively, in order to detect the electrostatic capacities of capacitive elements 109, a plurality of first switching transistors 110 provided individually for capacitive elements 109, connected at the gate electrodes thereof to first scanning circuit 115 by gate lines 114, connected at the source electrodes thereof to data lines 113 and connected at the drain electrodes thereof to detection electrodes 103, and a plurality of second switching transistors 111 provided individually for data lines 113, connected at the gate electrodes thereof to second scanning circuit 116, connected at the source electrodes thereof to data lines 113 and connected at the drain electrodes thereof to detection circuit 112. Switching transistor 117 for a resetting operation is provided in detection circuit 112.

In the following, operation of detection driving circuit unit 104 having the construction described above is described.

First, all of switching transistors 110 and transistors 111 are put into a conducting state by first and second scanning circuits 115 and 116 to select all of capacitive elements 109, thereby initializing the charge amounts charged in all of capacitive elements 109 to zero. Here, the initialization of capacitive elements 109 is performed by providing, in the condition wherein all of capacitive elements 109 are selected, a reset signal to switching transistor 117 for resetting incorporated in detection circuit 112 to set switching transistor 117 into a conducting state.

Thereafter, gate lines 114 are successively selected by first scanning circuit 115, and data lines 113 are successively selected by second scanning circuit 116.

When gate line 114 and data line 113 are selected, charging current flows into capacitive element 109 positioned at the intersecting point between gate line 114 and data line 113, and the charging current is measured by detection circuit 112.

In the following, a method of producing detection driving circuit unit 104 described above is described.

Figure 8A:
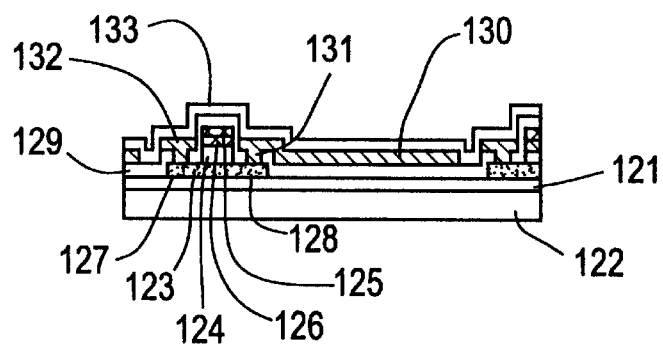
FIG. 8a is a sectional view of a switching transistor and a detection electrode connected to the switching transistor illustrating a production method for the detection driving circuit unit shown in FIG. 7.
Figure 8B:
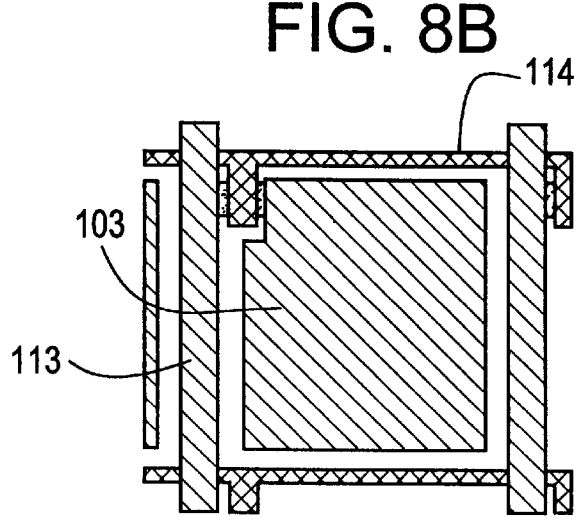

FIG. 8a is a sectional view of switching transistor 110 and detection electrode 103 connected to switching transistor 110 for explaining a method of producing detection driving circuit unit 104 shown in FIG. 7, and FIG. 8b is a plan view of switching transistor 110 and detection electrode 103 shown in FIG. 8a.

First, an amorphous silicon film is formed on the surface of glass substrate 122 on which silicon oxide film 121 is coated, and then heating processing is performed for the thus formed film to form polycrystalline silicon film 123.

Then, a silicon oxide film which is to form gate insulating film 124 and conductive film 125 are successively layered, and photo-etching is performed for conductive film 125 to form gate electrode 126 and gate line 114 connected to gate electrode 126.

Thereafter, ions of phosphorous are implanted into predetermined portions of polycrystalline silicon film 123 by ion implantation to form source region 127 and drain region 128 of the n+ conduction type.

Then, insulating protective film 129 of a silicon nitride film is layered and a window for electric connection is perforated through gate electrode 126 in source region 127 and drain region 128, and then, conductive film 130 of aluminum is formed.

Thereafter, photo-etching is performed for aluminum conductive film 130 to form drain electrode 131, detection electrode 103 connected integrally to drain electrode 131, source electrode 132 and data line 113 connected to source electrode 132.

Finally, surface protective film 133 of a silicon nitride film is layered, thereby completing detection driving circuit unit 104.

With the circuit construction of the present embodiment, if the capacitance values of capacitive elements 109 and the amounts of variations of the capacitances when a finger is pressed against shape transfer unit 108 are not large, the variation of charging current cannot be made large. Therefore, if the variation of the charging current is smaller than the level of noise which is generated in various conditions, detection of a fingerprint pattern is impossible.

In order to make the capacitance values of capacitive elements 109 higher, it is required to select a material having a higher dielectric constant for the deformation medium which forms deformation layer 105 in shape transfer unit 108 or to make the thickness of deformation layer 105 thinner.

On the other hand, in order to make the variation amounts of the capacitances of capacitive elements 109 larger, it is required to select a softer material which is deformed readily by a low pressure for the deformation medium which forms deformation layer 105 in shape transfer unit 108 or to make the thickness of deformation layer 105 thicker.

Here, the silicone compound may be of various forms such as rubber, gel and oil and is suitable for use as a deformation medium. For example, the product SE1740 by Toray Dow Coning Silicon Co. Ltd. is a two-liquid type silicone rubber put on the market as a product for potting, and in regard to its hardness after hardened, it is 3 in JIS(Japanese Industrial Standard) hardness (JIS A) and as soft as one tenth or less that of ordinary rubber. Further, its specific dielectric constant is approximately 3.

The silicone rubber mentioned above is, before hardened, in the form of oil whose viscosity is 920 mPa·s at room temperature, and deformation layer 105 was formed by dropping the silicone rubber by several drops onto the surface of detection driving circuit unit 104, smoothing the silicone rubber thin by rotational application and then hardening the silicone rubber. It is to be noted that, while the thickness of the applied layer can be varied by the number of rotations or the time of rotation in the rotational application, the thickness of the applied layer by rotation for one minute at the rotational frequency of 4,000 rpm was approximately 4 μm.

On the surface of the applied layer, a polyethylene terephthalate (PET) film of 10 μm thick having a vapor deposited film of Al on one surface thereof is layered such that the Al vapor deposited surface might contact with the applied layer, and then the applied layer is hardened.

The Al vapor deposited film forms flexible electrode 106 while the PET film of the base forms surface protective layer 107.

The hardening of the applied layer can be achieved by leaving it for more than 24 hours at room temperature. Alternatively, however, the applied layer may be heated for one hour to harden it sufficiently.

For detection driving circuit unit 104 described above, a detection driving circuit unit wherein detection electrodes 103 having the size of 80 μm square are arranged at intervals of 100 μm was used. As a result, a good fingerprint pattern was detected successfully. It is to be noted that the operating voltage was 5 V.

Surface protective layer 107 becomes more liable to be adapted to and deformed by a concave and convex configuration of a fingerprint as the thickness thereof decreases. While a PET film as thin as 4 μm is available as the PET film described in the present embodiment, a thin film has a problem in that it is difficult to form an Al vapor deposited film on the surface of it and it is not easy to handle. On the other hand, if surface protective layer 107 is formed thick, then it becomes less likely to be deflectively deformed, and this makes deformation of surface protective layer 107 following up the concave and convex configuration of the fingerprint impossible. Variation of the thickness of surface protective layer 107 to several values proved that, where the thickness exceeds 20 μm, the fingerprint pattern becomes blurred suddenly and exhibits a dull condition of a low contrast. In other words, it was found that the thickness of surface protective layer 107 must be equal to or smaller than 20 μm. It is considered that this well matches the fact that the concave and convex configuration of a fingerprint exhibits an average pitch of approximately 100 μm and an average amplitude of 50 μm.

The deformation medium which forms deformation layer 105 is required to be sufficiently soft when compared with the skin of a finger. However, data regarding the hardness of the skin are not available, and also it is not easy to measure the hardness of the skin newly. In the embodiment described above, several deformation media which are different in hardness were used to observe the condition of a fingerprint pattern. According to a result of the observation, where the hardness exceeded 30 in the JIS hardness (JIS A), the fingerprint pattern became unclear suddenly. Accordingly, it became clear that the hardness of the deformation medium must be equal to or lower than 30 degrees.

Here, for the deformation medium, a silicone compound in the form of gel is most suitable in addition to that described above. For example, the product JCR6134N by Toray Dow Coning Silicone Co. Ltd. put on the market as a junction coating resin is silicone gel of the two-liquid type and has a specific dielectric constant of 2.7. Since it has a low viscosity of 0.015 Pa·s before hardened, it is suitable as a thin film coating. It is to be noted that the film thickness obtained by rotational application for one minute at the rotational frequency of 4,000 rpm was 2 μm.

This silicone compound reduced the film thickness to one half when compared with the silicone rubber described hereinabove. Consequently, the electrostatic capacity between detection electrode 103 and flexible electrode 106 increased to twice, and a fingerprint pattern which was better than when the silicone rubber described above was used was obtained successfully.

(Second Embodiment)

Figure 9:
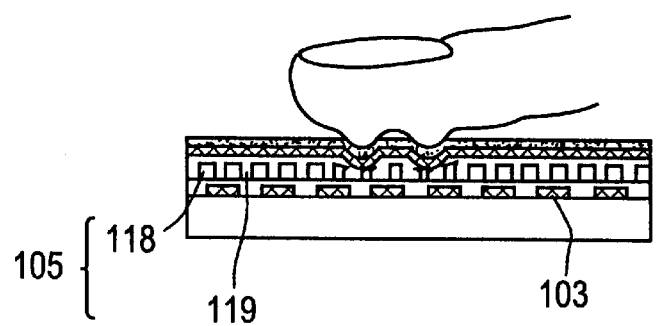
FIG. 9 is a schematic sectional view showing a construction of a second embodiment of the fingerprint detection apparatus of the present invention.

FIG. 9 is a schematic sectional view showing a construction of a second embodiment of the fingerprint detection apparatus of the present invention.

The present embodiment is different, as seen from FIG. 9, from the apparatus shown in FIG. 6 only in that deformation layer 105 is formed from a resilient layer having gaps 118 formed on one surface thereof, but otherwise is the same the apparatus shown in FIG. 6.

In particular, while, in the apparatus shown in FIG. 6, a deformation material is used densely for deformation layer 105, in the present embodiment, gaps 118 are formed in deformation layer 105. Consequently, deformation layer 105 in the present embodiment exhibits a greater deformation amount with respect to an equal pressure when compared with deformation layer 105 which is formed with an equal thickness from a same deformation material.

The reason is that, while an ordinary material has a characteristic that, when the deformation material is crushed in a vertical direction, it is swollen in a horizontal direction at right angles to the vertical direction. When the material is filled densely, the deformation in the horizontal direction is limited, and consequently, deformation layer 105 also becomes less likely to be deformed by the pressure in the vertical direction. Gaps 118 in the present embodiment provide an effect of reducing the limitation to the deformation in the horizontal direction.

The width of gaps 118 is required to be set to such a degree that gaps 118 can absorb the deformation in the horizontal direction by the pressure in the vertical direction, and it is sufficient if the width is set to 20 to 30% the amount by which deformation layer 105 is crushed by the pressure in the horizontal direction. This value is as low as approximately 10% the thickness of deformation layer 105.

On the other hand, while various conventionally known formation methods can be used for formation of gaps 118, the minimum width of gaps 118 can be reduced only to the a degree as is equal to the depth of gaps 118. Since it is desirable that the depth of gaps 118 be as great as possible, if the depth of gaps 118 is set approximately equal to the thickness of deformation layer 105, the width of gaps 118 also becomes approximately equal to the thickness of deformation layer 105 and cannot be made smaller than this.

Accordingly, as far as any of the various conventionally known formation methods is used to form gaps 118, the width of gaps 118 does not become excessively small.

Meanwhile, between gaps 118, angular posts or circular posts which serve as posts 119 of the deformation material are formed. If the width of posts 119 is increased, then the deformation amount of deformation layer 105 is decreased, and the effect of provision of gaps 118 decreases. Accordingly, it is desirable to reduce the width of posts 119 of the deformation material as much as possible.

Also in this instance, as far as any of various conventionally known formation methods is employed, the minimum distance between gaps 118, that is, the width of posts 119 of the deformation material, is approximately equal to the thickness of deformation layer 105, and it is difficult to make the width smaller than this.

In the present embodiment, the silicone rubber SE1740 by Toray Dow Coning Silicone Co. Ltd. mentioned hereinabove was used to form deformation layer 105 having gaps 118 therein.

Deformation layer 105 formed has a thickness of 5 μm and gaps 118 are juxtaposed like a grating such that they have a width and a depth of 4 μm and the distance between gaps 118 is 5 μm. In particular, angular posts of rubber having a section of 5 μm square and having a height of 4 μm are aligned in rows and columns at intervals of 4 μm. Further, the angular posts depend from a rubber layer of 1 μm thick.

As the deformation amount of deformation layer 105 when a finger is pressed against deformation layer 105, a high value of approximately 40% the thickness of deformation layer 105 was obtained successfully.

Where this deformation layer 105 was applied to a detection driving circuit wherein detection electrodes 103 of 80 μm square were arranged at the pitch of 100 μm, noise components of the detection signal were reduced and better fingerprint pattern detection was performed successfully.

While, in the present embodiment, gaps 118 are formed by angular posts or circular posts in deformation layer 105, gaps 118 may alternatively be formed by truncated pyramids or truncated cones.

Figure 10:
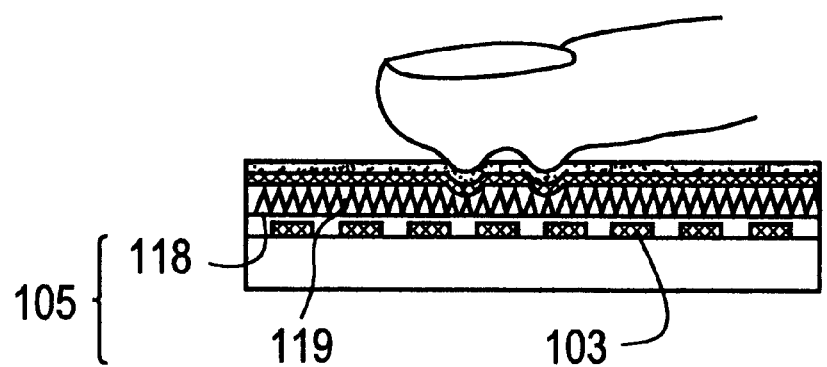
FIG. 10 is a view showing an example wherein a gap of a deformation layer shown in FIG. 9 is formed by an angular or circular post.

FIG. 10 is a view showing an example wherein gaps 118 of deformation layer 105 shown in FIG. 9 are formed by angular posts or circular posts.

In the present embodiment, due to an effect of the gaps formed in deformation layer 105, where a same deformation medium is used, an increased deformation amount can be obtained. However, in a range within which an equal deformation amount is obtained, use of a harder deformation medium is allowed. As a result of observation of the condition of a fingerprint pattern with regard to several deformation media which are different in hardness, it was confirmed that a good fingerprint pattern was obtained where a deformation material having a hardness up to 50 was used.

(Third Embodiment)

In the embodiments described above, wherein silicone oil and silicone gel were used, when, in order to raise the resolution of a fingerprint pattern, the magnitude of detection electrodes 103 was reduced to 40 μm square while the pitch of the arrays of detection electrodes 103 was set to 50 μm and the detection driving circuit was used, many noise components were included in the detection signal and detection of a good fingerprint pattern was difficult. This is because the magnitude of detection electrodes 103 becomes small and the static capacities between detection electrodes 103 and flexible electrode 106 become small and because the deformation amount of deformation layer 105 when a finger is pressed against deformation layer 105 is insufficient even with approximately 40% at the maximum.

Thus, if the deformation amount of deformation layer 105 can be further increased, then the electrostatic capacities of portions at which deformation layer 105 is crushed to decrease the thickness are increased and also the variation amounts in capacity can be increased. An embodiment which realizes the conditions just described is described below with reference to the drawings.

Figure 11:
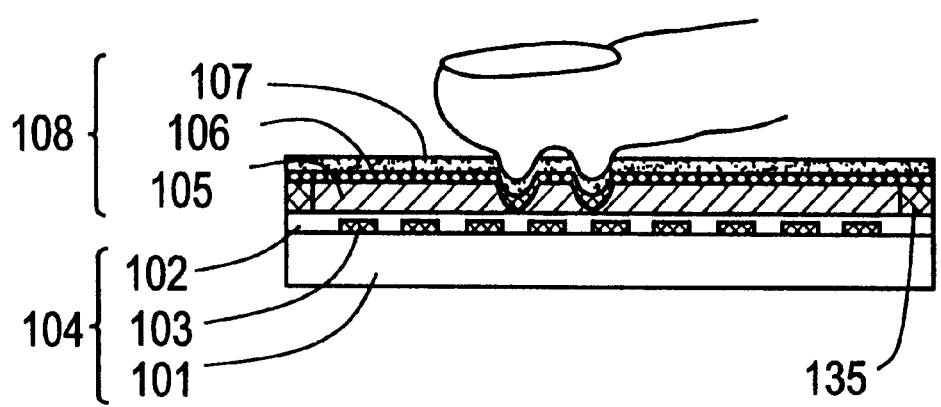
FIG. 11 is a schematic sectional view showing a construction of a third embodiment of the fingerprint detection apparatus of the present invention.

FIG. 11 is a schematic sectional view showing a construction of a third embodiment of the fingerprint detection apparatus of the present invention. The present embodiment is different from the apparatus shown in FIG. 6 only in that deformation layer 105 is made of a fluid medium and that support members 135 are provided at peripheral sides of deformation layer 105 between detection driving circuit unit 104 and deformation layer 105. The fluid medium which serves as deformation layer 105 is filled and enclosed in a region surrounded by detection driving circuit unit 104, flexible electrode 106 and support members 135. It is to be noted that flexible electrode 106 is supported on surface protective layer 107.

As described in the first and second embodiments above, when a resilient substance such as rubber is used for the deformation layer, the fact that such deformation media exhibit a variation in volume in accordance with a pressure thereto is made use of, but in the present embodiment, use is made of the fact that a fluid medium is pushed out and moves to a location which is comparatively low in pressure if pressure is applied to it, although there is very little variation in volume.

In particular, when a finger is pressed against deformation layer 105, at a ridge portion of the fingerprint, the fluidic medium upon which the pressure acts moves to a peripheral portion or a valley portion of the fingerprint where the pressure is lower. Consequently, flexible electrode 106 comes to an almost contacting condition with protective layer 102 on the surface of detection driving circuit unit 104.

Since the fluid medium moves in a narrow space, the fluid resistance is high and the internal pressure of the fluid pressure becomes high. As a result, at a valley portion of the fingerprint, the thin film which forms surface protective layer 107 is deformed in such a manner as to be closely contacted with the skin and the fluid medium intervenes between flexible electrode 106 and protective layer 102 of detection driving circuit unit 104. In this instance, the electrode-electrode distance which determines the electrostatic capacity between detection electrode 103 and flexible electrode 106 is, at a ridge portion of the fingerprint, substantially equal to the thickness of protective layer 102 of detection driving circuit unit 104, but at a valley portion of the fingerprint, substantially equal to the magnitude of the concave and convex configuration of the fingerprint. It is to be noted that the thickness of protective layer 102 is in the range of submicrons, and the electrostatic capacity corresponding to a ridge portion of the fingerprint becomes larger by approximately 100 times the value where such a rubber material as described hereinabove is used.

As a result, a good fingerprint pattern was obtained successfully even when a detection circuit wherein the magnitude of detection electrodes 103 was 40 $\mu$m square and the pitch of the arrays of detection electrodes 103 was as fine as 50 $\mu$m was used.

It is to be noted that, for the fluid medium in the present embodiment, a fluid medium can be used only if it has an insulating property and has a stable electric characteristic. Silicone oil is superior in stability and electric characteristic and is most suitable for the fluid medium in the present embodiment. For example, the product SH200 by Toray Dow Coning Silicone Co. Ltd. is put on the market for a universal use and it can be used for various applications, and also the viscosity can be selected from a range from a low viscosity to a high viscosity.

(Fourth Embodiment)

While detection driving circuit unit 104 shown in FIG. 7 measures the amounts of charge charged to and discharged from detection electrodes 103, since the amounts of charge to be measured are small and the variations in charge amount are smaller as described in connection with the embodiments hereinabove, it is not easy to stably obtain electric signal outputs corresponding to a fingerprint pattern.

Therefore, a fingerprint detection apparatus which can obtain more stable electric signal output is described as a fourth embodiment.

Figure 12:
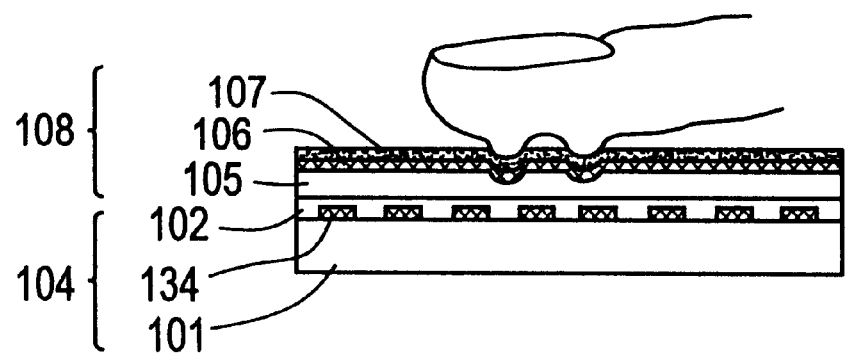
FIG. 12 is a schematic sectional view showing a construction of a fourth embodiment of the fingerprint detection apparatus of the present invention.

FIG. 12 is a schematic sectional view showing a construction of the fourth embodiment of the fingerprint detection apparatus of the present invention.

The present embodiment is different from the apparatus shown in FIG. 6 only in that, as shown in FIG. 12, it includes, in place of detection electrodes 103 shown in FIG. 6, detection electrodes 134 which are arranged in arrays on substrate member 101 for detecting the pattern of a finger print based on the distances of the fingerprint from flexible electrode 106, but is otherwise similar to the apparatus shown in FIG. 6.

Figure 13:
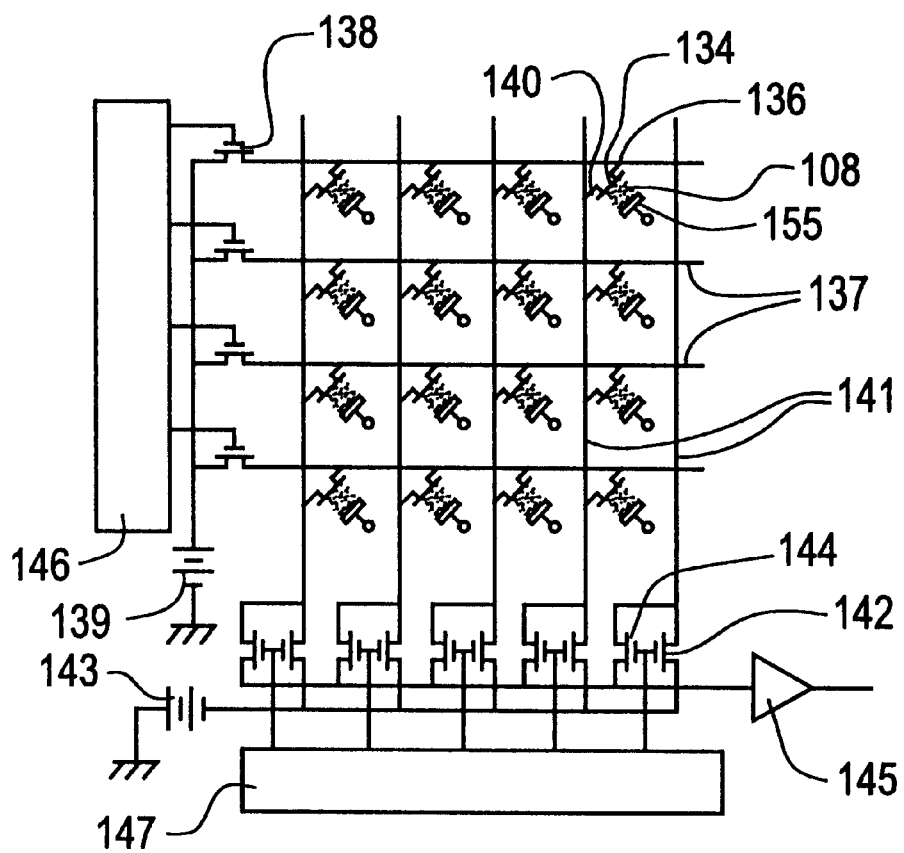
FIG. 13 is a circuit diagram showing an example of a construction of a detection driving circuit unit shown in FIG. 12.

FIG. 13 is a circuit diagram showing an example of a construction of detection driving circuit unit 104 shown in FIG. 12.

Detection driving circuit unit 104 in the present embodiment includes, as shown in FIG. 13, detection circuit 145 which detects currents flowing through a plurality of detection electrodes 134 arranged in a matrix and each formed from a source region, a drain region and a channel region interconnecting the source and drain regions, converts results of the detection into electric signals and outputs the electric signals as a pattern of the fingerprint, source lines 137 connected between source electrodes 136 of detection electrodes 134, drain lines 141 connected between drain electrodes 140 of detection electrodes 134, first and second scanning circuits 146 and 147 for successively selecting detection electrodes 134 in the row direction and the column direction, respectively, to apply a predetermined source-drain voltage in order to detect currents flowing through individual detection electrodes 134, a plurality of first switching transistors 138 provided individually for source lines 137, connected at the gate electrodes thereof to first scanning circuit 146 and connected at the drain electrodes thereof to source lines 137, a plurality of second switching transistors 144 provided individually for drain lines 141, connected at the gate electrodes thereof to second scanning circuit 147, connected at the source electrodes thereof to drain lines 141 and connected at the drain electrodes thereof to detection circuit 145, source power supply 139 connected to the source electrodes of first switching transistors 138, field effect transistors 142 connected at the gate electrodes thereof to the gate electrodes of second switching transistors 144, connected at the drain electrodes thereof to the source electrodes of second switching transistors 144 and functioning as constant current sources, and drain power supply 143 connected to the source electrodes of field effect transistors 142.

It is to be noted that the channel regions described above are covered with an insulating protective film, and flexible electrode 106 of shape transfer unit 108 formed on the protective film forms gate electrodes 155 for controlling the conductivity of the channel regions.

Further, since flexible electrode 106 is fixed to a predetermined potential, gate electrodes 155 are fixed to an equal potential among all detection electrodes 134.

In the following, operation of detection driving circuit unit 104 having the construction described above is described.

If a finger is pressed against shape transfer unit 108, then flexible electrode 106 is deformed along concave and convex patterns of the fingerprint so that, for each of detection electrodes 134, the distance between its channel region and gate electrode 155 varies.

Here, while the potentials of gate electrodes 155 are fixed to a fixed potential, since the gate capacities vary for individual detection electrodes 134, when a predetermined source-drain voltage is applied, the channel current of each detection electrode 134 is different.

Thus, if one of the plurality of detection electrodes 134 is selected by first and second scanning circuits 146 and 147, then selected detection electrode 134 is connected to source power supply 139 and drain power supply 143 so that the source-drain voltage is applied to detection electrode 134 and detection electrode 134 enters a condition wherein it can flow channel current corresponding to the gate capacity at that time.

While channel current flows from source power supply 139 through the channel of selected detection electrode 134 into drain power supply 143, it is limited by field effect transistor 142 placed on the intermediate path. Consequently, the potential of drain electrode 140 of detection electrode 134 varies in response to the value of the gate capacity.

This voltage variation is detected by detection circuit 145 through second switching transistor 144 and outputted as an electric signal corresponding to the concave and convex patterns of the fingerprint.

The circuit shown in FIG. 13 is produced by a thin film transistor manufacturing technique using a polycrystalline silicon film similarly to that described hereinabove with reference to FIGS. 7, 8a and 8b.

Figure 14:
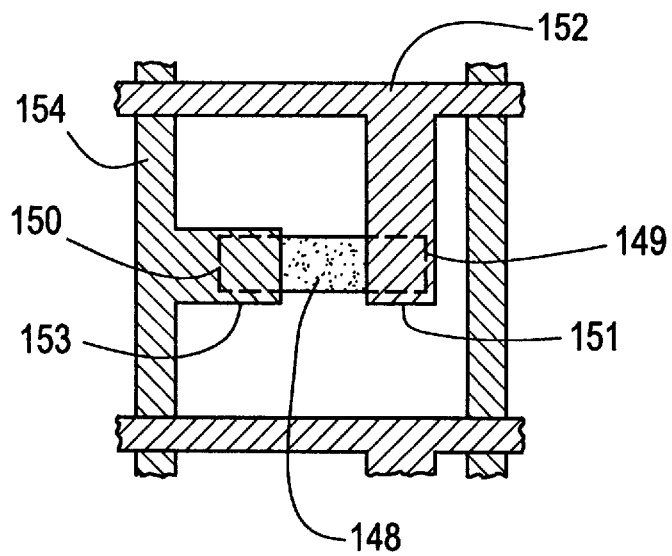
FIG. 14 is a plan view showing a general structure of a detection element shown in FIG. 13.

FIG. 14 is a plan view showing a general structure of detection electrode 134 shown in FIG. 13.

In the production process described hereinabove with reference to FIG. 8, the layering of a conductive film and the photo-etching for forming a gate electrode and a gate line connected to the gate electrode are unnecessary for detection electrode 134 shown in FIG. 14.

In particular, a gate insulating film of a silicon oxide film is layered on polycrystalline silicon film 148 formed on a glass substrate on which a silicon oxide film is coated, and ion implantation of phosphorus is performed to form source region 149 and drain region 150.

Then, a window for electrode connection is formed in the source region, and a conductive film of aluminum is layered, whereafter photo-etching is performed to form source electrode 151 and source line 152 connected to source electrode 151.

Then, an insulating protective film of a silicon oxide film is layered, and then, a window for electrode connection is formed in the drain region and a conductive film of aluminum is layered above it, whereafter photo-etching is performed for the conductive film to form drain electrode 153 and drain line 154 connected to drain electrode 153.

Finally, a silicon nitride film which serves as a surface protective layer is layered, thereby completing the detection driving circuit unit.

In the present embodiment, since the amplification function of a field effect transistor is used for detection of a capacity variation, stable detection can be achieved.

As an example, where a polycrystalline silicon film whose electron mobility was 120 $cm^2/V/s$ and the width and the length of the gate electrodes were 40 $\mu$m and 10 $\mu$m, respectively, while the thickness and the dielectric constant of the gate insulating film was 10 $\mu$m and $3.4\times10^{-13}$ F/cm, the drain current when the gate voltage was set higher by 5 V than the threshold voltage value was 10.2 $\mu$A. The value thus obtained was sufficiently higher than the noise level. When the thickness of the gate insulating film was reduced from 10 $\mu$m by 1 $\mu$m to 9 $\mu$m while the current value specified as above is maintained as a fixed current value, the gate voltage changed from 5 V to 4.7 V, and consequently, a sufficiently great voltage variation of 260 mV was obtained.

In other words, according to the present embodiment, since a high definition wherein detection electrodes 134 are arranged at a pitch of 50 $\mu$m is realized and the thickness of the deformation layer in the shape transfer unit can be made as thick as 10 $\mu$m, production of the apparatus is facilitated.

(Fifth Embodiment)

While, in the embodiments described above, each of detection elements 134 is formed from a field effect transistor which has a configuration having no gate electrode, otherwise the configuration of a field effect transistor can be utilized as it is for detection electrodes 134.

Figure 15:
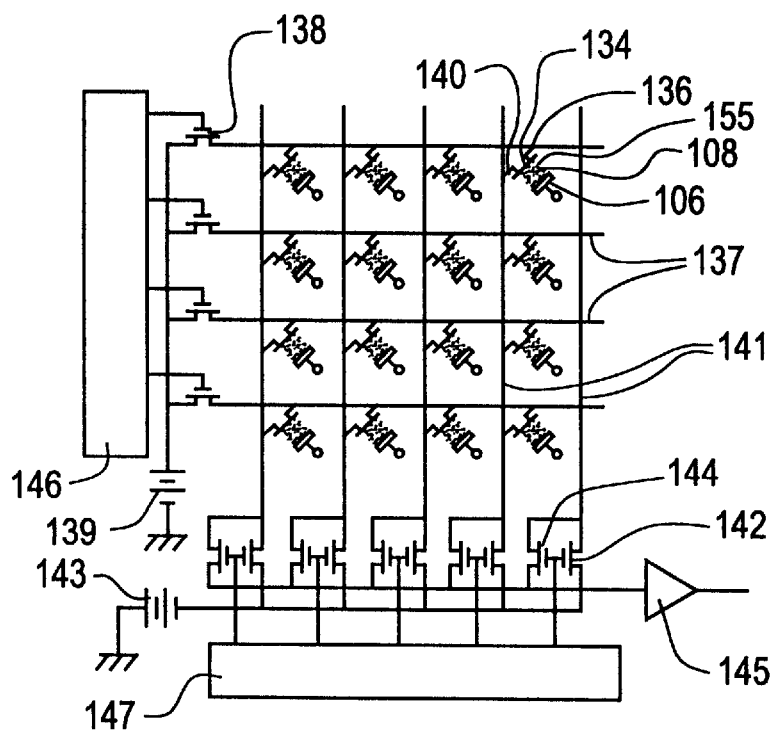
FIG. 15 is a view showing a construction of a fifth embodiment of the fingerprint detection apparatus of the present invention.

FIG. 15 is a view showing a construction of a fifth embodiment of the fingerprint detection apparatus of the present invention and shows an example of a construction of a detection driving circuit unit.

As shown in FIG. 15, in the present embodiment, each of detection electrodes 134 is a field effect transistor having gate electrode 155, and shape transfer unit 108 is formed on upper faces of gate electrodes.

This structure stabilizes the characteristic of detection electrodes 134 and besides significantly reduces an accident that detection electrode 134 is electrostatically damaged in the step of layering shape transfer unit 108.

In this instance, since the potential of the gate electrode is in a floating condition and depends upon the potential of flexible electrode 106 in shape transfer unit 108, the detection operation characteristic is substantially similar to that shown in FIG. 13.

If the detection driving circuit unit shown in FIG. 13 or 15 is applied to any of the fingerprint detection apparatus shown in FIGS. 9, 10 and 11, then a fingerprint detection apparatus which is high in stability and high in sensitivity can be implemented.

It is to be understood that variations and modifications of FINGERPRINT DETECTION APPARATUS disclosed herein will be evident to those skilled in the art. It is intended that all such modifications and variations be included within the scope of the appended claims.

What is claimed is:

1. A fingerprint detection apparatus, comprising:
   a shape transfer unit having a contact face for being contacted by a finger whose fingerprint is to be detected, a thickness of said shape transfer unit varying when the finger contacts with a surface which serves as the contact face, in accordance with pressures which are produced by concave and convex patterns of the fingerprint of the finger; and
   a detection driving circuit unit for detecting a pattern of the fingerprint based on variations of the thickness of said shape transfer unit and outputting results of the detection as electric signals, wherein said detection driving circuit unit detects variations of the thickness of the shape transfer unit as variations of an electrostatic capacity and detects the pattern of the fingerprint based on the variations of the electrostatic capacity, and wherein said shape transfer unit further comprises:
   an insulating deformation layer formed on said detection driving circuit unit and its thickness varies in accordance with the pressures produced by the concave and convex patterns of the fingerprint, said deformation layer having a plurality of gaps on one surface;
   a flexible electrode formed on said deformation layer and deformable based on the pressures produced by the concave and convex patterns of the fingerprint; and a deformable surface protective film formed on said flexible electrode for protecting said flexible electrode.

2. A fingerprint detection apparatus as claimed in claim 1, said detection driving circuit unit includes:

a substrate member;

a plurality of detection electrodes arranged in arrays on said substrate member for detecting the pattern of the fingerprint based on electrostatic capacities between said detection electrodes and said flexible electrode;

a detection circuit for detecting the electrostatic capacities between said detection electrodes and said flexible electrode, converting results of the detection into electric signals and outputting the electric signals as the pattern of the fingerprint;

first and second scanning circuits for successively selecting said detection electrodes in a row direction and a column direction respectively; and first and second switching elements for switching connections between said first and second scanning circuits and said detection electrodes and connections between said detection circuit and said detection electrodes under the control of said first and second scanning circuits.

3. A fingerprint detection apparatus as claimed in claim 1, wherein said detection electrodes are covered with an insulating protective layer.

4. A fingerprint detection apparatus, comprising:

a shape transfer unit having a contact face for being contacted by a finger whose fingerprint is to be detected, a thickness of said shape transfer unit varying when the finger contacts with a surface which serves as the contact face, in accordance with pressures which are produced by concave and convex patterns of the fingerprint of the finger; and a detection driving circuit unit for detecting a pattern of the fingerprint based on variations of the thickness of said shape transfer unit and outputting results of the detection as electric signals, said detection driving circuit comprising:

a substrate member;

a plurality of detection elements arranged in arrays on said substrate member, electric current which flows through said detection elements varying in response to variations of the thickness of said shape transfer unit;

a detection circuit for detecting the electric currents flowing through said detection elements, converting results of the detection into electric signals and outputting the electric signals as the pattern of the fingerprint;

first and second scanning circuits for successively selecting said detection elements in a row direction and a column direction, respectively; and first and second switching elements for switching connections between said first and second scanning circuits and said detection elements and connections between said detection circuit and said detection elements under the control of said first and second scanning circuits, and wherein said shape transfer unit further comprises:

an insulating deformation layer formed on said detection driving circuit unit and its thickness varies in accordance with the pressures produced by the concave and convex patterns of the fingerprint;

a flexible electrode formed on said deformation layer and deformable based on the pressures produced by the concave and convex patterns of the fingerprint; and a deformable surface protective film formed on said flexible electrode for protecting said flexible electrode.

5. A fingerprint detection apparatus as claimed in claim 4, wherein each of said detection elements has a source region, a drain region, and a channel region between the source region and the drain region.

6. A fingerprint detection apparatus as claimed in claim 5, wherein field effect transistors are formed whose gate electrodes are said flexible electrode in said shape transfer unit.

7. A fingerprint detection apparatus as claimed in claim 4, wherein said deformation layer has a plurality of gaps on one surface thereof.

8. A fingerprint detection apparatus as claimed in claim 1, wherein said flexible electrode is covered with a flexible protective film having a thickness of 20 $\mu$m or less.

9. A fingerprint detection apparatus as claimed in claim 4, wherein said flexible electrode is covered with a flexible protective film having a thickness of 20 $\mu$m or less.

10. A fingerprint detection apparatus as claimed in claim 1, wherein said surface protective film is formed from a plastic film, and said flexible electrode is formed from a conductive thin film in the form of a metal or metal oxide film layered on one surface of said plastic film.

11. A fingerprint detection apparatus as claimed in claim 4, wherein said surface protective film is formed from a plastic film, and said flexible electrode is formed from a conductive thin film in the form of a metal or metal oxide film layered on one surface of said plastic film.

12. A fingerprint detection apparatus as claimed in claim 1, wherein said deformation layer is formed from a film made of an insulating rubber material whose hardness is equal to or lower than 50 degrees (hardness Hs according to JIS (Japanese Industrial Standard) A) and having a thickness equal to or less than 50 $\mu$m.

13. A fingerprint detection apparatus as claimed in claim 4, wherein said deformation layer is formed from a film made of an insulating rubber material whose hardness is equal to or lower than 50 degrees (hardness Hs according to JIS (Japanese Industrial Standard) A) and having a thickness equal to or less than 50 $\mu$m.

14. A fingerprint detection apparatus as claimed in claim 4, wherein said deformation layer is formed from a film made of an insulating rubber material whose hardness is 30 degrees (hardness Hs according to JIS (Japanese Industrial Standard) A) or less and having a thickness equal to or less than 50 $\mu$m.

15. A fingerprint detection apparatus as claimed in claim 1, wherein said deformation layer is formed from an insulating deformation medium in the form of gel.

16. A fingerprint detection apparatus as claimed in claim 4, wherein said deformation layer is formed from an insulating deformation medium in the form of gel.

17. A fingerprint detection apparatus as claimed in claim 1, wherein said deformation layer is formed from an insulating fluid medium.

18. A fingerprint detection apparatus as claimed in claim 4, wherein said deformation layer is formed from an insulating fluid medium.

* * * * *